(12) United States Patent
Elms et al.

(10) Patent No.: US 9,334,970 B2
(45) Date of Patent: May 10, 2016

(54) APPARATUS AND METHOD FOR FLUID CONTROL

(71) Applicant: Haven Technology Solutions LLC, Magnolia, TX (US)

(72) Inventors: David J. Elms, Magnolia, TX (US); Gregory A. Hudspeth, Amarillo, TX (US)

(73) Assignee: Haven Technology Solutions LLC, Magnolia, TX (US)

( * ) Notice: Subject to any disclaimer, the term of this patent is extended or adjusted under 35 U.S.C. 154(b) by 127 days.

(21) Appl. No.: 14/303,109

(22) Filed: Jun. 12, 2014

(65) Prior Publication Data

US 2014/0366949 A1 Dec. 18, 2014

Related U.S. Application Data

(63) Continuation-in-part of application No. 13/917,341, filed on Jun. 13, 2013, now Pat. No. 8,991,426.

(51) Int. Cl.
*F16K 11/085* (2006.01)
*F16K 11/076* (2006.01)

(52) U.S. Cl.
CPC .......... *F16K 11/085* (2013.01); *F16K 11/076* (2013.01); *Y10T 137/0318* (2015.04); *Y10T 137/0363* (2015.04); *Y10T 137/0396* (2015.04); *Y10T 137/85986* (2015.04); *Y10T 137/86879* (2015.04)

(58) Field of Classification Search
USPC .......................................... 210/110, 115, 137
See application file for complete search history.

(56) References Cited

U.S. PATENT DOCUMENTS

| | | | |
|---|---|---|---|
| 2,335,085 A | 11/1943 | Roberts | |
| 2,591,102 A | 4/1952 | Snyder, Jr. | |
| 2,820,438 A | 1/1958 | Andrews et al. | |
| 3,586,049 A | 6/1971 | Adamson | |
| 3,957,082 A | 5/1976 | Fuson et al. | |
| 4,921,605 A * | 5/1990 | Chastan-Bagnis | E02B 15/046 210/115 |
| 6,375,835 B1 * | 4/2002 | Lee | C02F 1/40 210/104 |
| 6,880,798 B2 | 4/2005 | Meyer et al. | |
| 7,766,883 B2 | 8/2010 | Relly et al. | |
| 8,062,269 B2 | 11/2011 | Keeley | |
| 2006/0174885 A1 | 8/2006 | Aylsworth et al. | |
| 2011/0319836 A1 | 12/2011 | Lee | |

FOREIGN PATENT DOCUMENTS

EP 0961060 A1 12/1999

OTHER PUBLICATIONS

Search Report and Written Opinion of the International Searching Authority, Dec. 19, 2014, 12 pages; USPTO International Searching Authority.

* cited by examiner

*Primary Examiner* — John Fox
(74) *Attorney, Agent, or Firm* — Haynes and Boone, LLP (57) ABSTRACT

A multi-phase separation flow management system includes a housing with an inlet, a first outlet and a second outlet and in which a movable element is mounted. The movable element has a first passageway with an inlet and an outlet and a second passageway having an inlet and an outlet, and are disposed in the element so that the inlets of the first and second passageways are adjacent one another and the outlets of the first and second passageways are spaced apart from one another. The inlets are disposed adjacent a housing inlet, the first passageway outlet is disposed adjacent a first housing outlet and the second passageway outlet is disposed adjacent a second housing outlet.

32 Claims, 8 Drawing Sheets

APPARATUS AND METHOD FOR FLUID
CONTROL

PRIORITY

This application claims priority to and is a continuation-in-part of U.S. application Ser. No. 13/917,341 entitled, "Apparatus and Method for Fluid Control," filed Jun. 13, 2013, the disclosure of which is hereby incorporated by reference in its entirety.

FIELD OF THE INVENTION

The present invention generally relates to the separation of components in a multi-phase flow stream. More specifically, it relates to a valve that can be used to alter the cut of fluids passing therethrough.

BACKGROUND OF THE INVENTION

A multi-component flow stream include a mixture of different fluids which may have different phases, such as air and water, steam and water, or oil and natural gas, or the same phase, such as liquid water and oil. It is often desirable to separate or otherwise manage these flow streams. In the prior art, such separation is commonly accomplished utilizing a phase separator utilizing a weir plate or foil disposed within a flow stream to divert a portion of the flow. It would be desirable to provide an improved system to manage the flow of multi-component and or multi-phase streams, such as for example, separating two liquid components of a flow stream.

SUMMARY OF THE INVENTION

The invention relates to a valve having an adjustable element with at least two flow passages or channels defined in the adjustable element. In one aspect of the invention, the valve is used to separate components of a stratified flow stream. In such case, the channels intersect one another to form a leading edged adjacent an inlet flow port through which the steam is flowing. Movement of the adjustable element alters the positions of the flow passages relative to a flow port, permitting the leading edge to be positioned in the flow steam at the stratification boundary between the components of the flow stream, such that one component passes through a first channel and the second component passes through a second channel. In one embodiment, the adjustable element may be a cylinder or block that can be linearly translated in order to alter the position of the flow passages relative to the flow port. In another embodiment, the adjustable element may be angularly rotatable to alter the relative positions. In one embodiment, the adjustable element may be a rotatable cylinder having two flow passages therethrough. Rotation of the cylinder adjust the positions of the flow passages relative to a liquid-liquid flow stream, exposing more or less of a particular passage to the flow steam.

The invention therefore allows a multi-phase and/or multi-component fluid to be effectively separated with the valve of the disclosure.

The valve may also be utilized to mix two fluids together by adjusting the relative amounts of two fluid components that comprise a fluid flow stream. In such case, separate fluid components are introduced into the flow passages and are merged together into a single flow stream at the leading edge of the adjustable element. In such case, the adjacent flow port functions as a fluid outlet. The relative components of the flow stream in the fluid outlet can be controlled by movement of the adjustable element.

BRIEF DESCRIPTION OF THE DRAWINGS

A more complete understanding of the present disclosure and advantages thereof may be acquired by referring to the following description taken in conjunction with the accompanying figures, wherein:

FIG. 1b illustrates a three-dimensional view of a block than can translate in the valve housing of FIG. 1a.

FIG. 1c illustrates a three-dimensional view of a cylinder than can translate in the valve housing of FIG. 1a.

FIG. 2b illustrates a three-dimensional view of a cylinder than can rotate in the valve housing of FIG. 2a.

FIG. 2c illustrates a three-dimensional view of a circular disk than can rotate in the valve housing of FIG. 2a.

FIG. 3b illustrates a three-dimensional view of a block than can linearly translate in the valve housing of FIG. 3a.

FIG. 3c illustrates a three-dimensional view of a cylinder than can linearly translate in the valve housing of FIG. 3a.

FIG. 4b illustrates a three-dimensional view of a circular disk than can rotate in the valve housing of FIG. 4a.

DETAILED DESCRIPTION

In the detailed description of the invention, like numerals are employed to designate like parts throughout. Various items of equipment, such as pipes, valves, pumps, fasteners, fittings, etc., may be omitted to simplify the description. However, those skilled in the art will realize that such conventional equipment can be employed as desired.

Figure 1A:
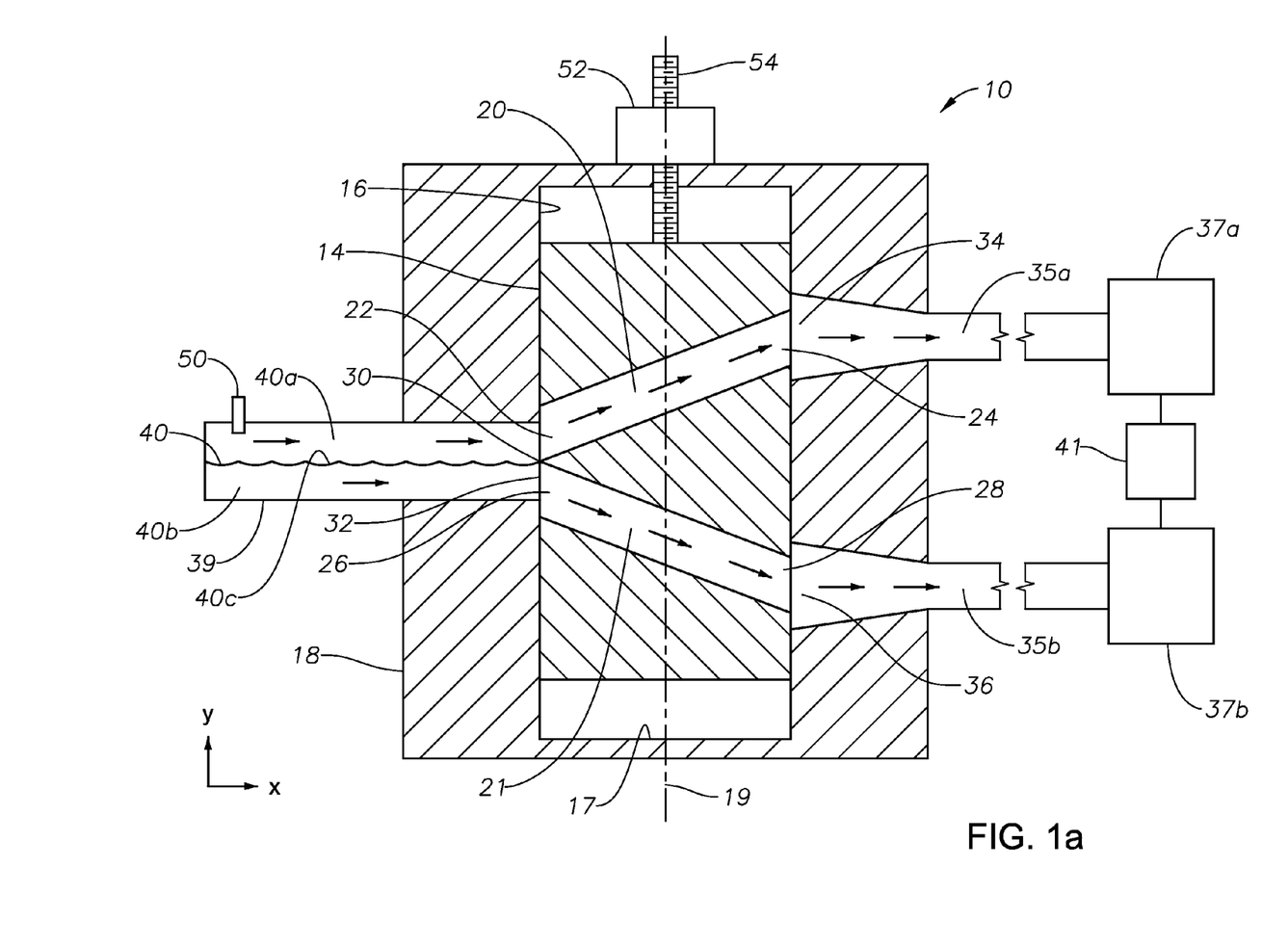
FIG. 1a illustrates a cross-sectional side view of an embodiment of an adjustable valve used as a fluid-fluid phase splitter in which the moveable element is a block or cylinder that translates along a vertical axis.
Figure 1B:
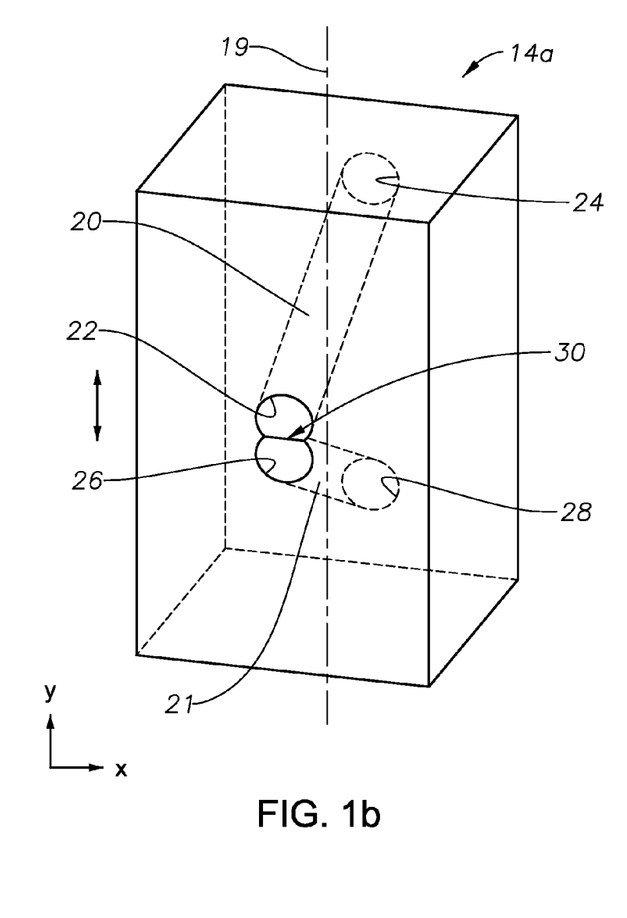
Figure 1C:
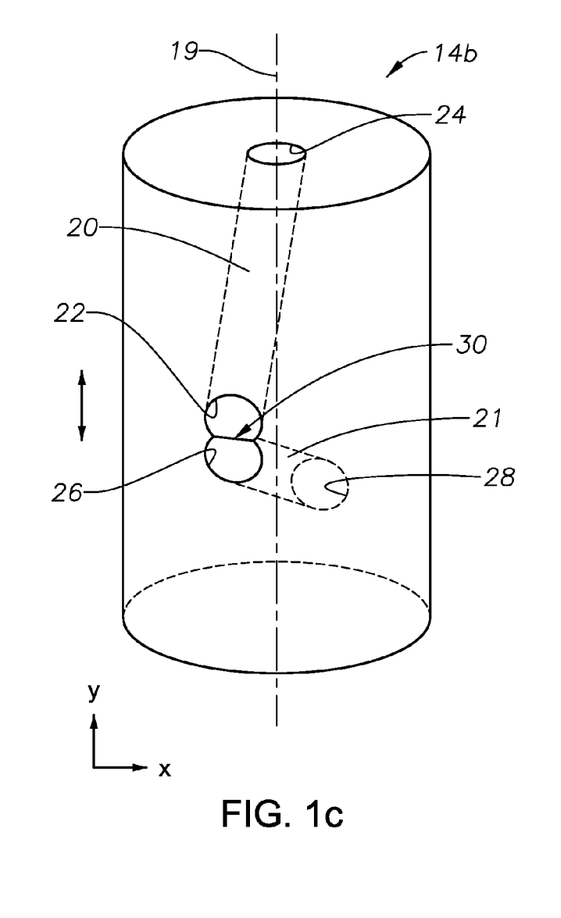

FIGS. 1a-1c illustrate one embodiment of a valve 10 having an adjustable valve element 14 positioned where valve 10 can function as a fluid-fluid phase splitter as described below. Movable valve element 14 is mounted to translate in a valve bore 16 defined within a valve housing 18 to form a valve seat 17. Movable element 14 includes a first passageway 20 having a first passage port 22 and a second passage port 24, as well as a second passageway 21 having a third passage port 26 and a forth passage port 28. As will be explained below, for the embodiments illustrated in FIGS. 1a-1c, bore 16 is preferably vertically oriented as illustrated by vertical axis 19.

FIG. 1b illustrates movable valve element 14 as a slidable block 14a, while FIG. 1c illustrates movable valve element 14 as a slidable cylinder 14b. Block 14 may have a cross-section that is square, rectangular, triangular or of another shape so long as it is translatable in a bore 16 as described herein. Preferably, bore has a corresponding cross-sectional shape to permit linear translation therein by block 14. In any case, passageways 20, 21 are formed in element 14 so that ports 22, 26 are adjacent one another, while ports 24, 28 are spaced apart from one another a sufficient distance to ensure that passageway 20 does not communicate with outlet housing port 36 (discussed below) as valve element 14 is adjusted in accordance herewith and to ensure that passageway 21 does not communicate with outlet housing port 34 (discussed below) as valve element 14 is adjusted. In one embodiment, passageways 20, 21 converge or come together at ports 22, 26 so that a portion of valve element 14 defining passageways 20, 21 forms an edge 30 at the apex of the converging passageways. Edge 30 is preferably substantially horizontally disposed. Moreover, it will be appreciated that edge 30 functions to divide laminar flow from a flow passage 39 into two separate portions, while minimizing turbulence at edge 30, so that the separate portions of the flow are directed to separate passages 20, 21. In this regard, as best seen in FIG. 1a, in one or more preferred embodiments, edged 30 forms a point at the convergence of the two passageways 20, 21, and the pointed edge 30 can be positioned at the boundary between the two separate portions of the flow. In one or more embodiments, as shown in FIG. 1b, the cross-section of pointed edge 30 is triangular in shape adjacent flow passage 39 so as to form a point at the apex of the converging passageways, although it will be appreciated that paths of passageways 20, 21 in element 14 need not form a triangular cross-section therebetween beyond forming edge 30. More particularly, it will be appreciated that each passageway has a wall formed by element 14, and it is the respective walls of the two passageways 20, 21 that intersect to form the pointed edge 30. While the most preferred embodiments contemplate an edge 30 forming a point at the apex of the converging passageways, in other embodiments, edge 30 may be rounded so long as edge 30 does not create turbulence as the laminar flow is divided by edge 30. Thus, in some embodiments, the rounded edge may have a radius of no more than about 0.5 inches, while in other embodiments the rounded edge may have a radius of no more than about 0.32 inches. However, those skilled in the art will appreciate that the physical size of the valve may dictate the radius of edge 30. Thus, in some embodiments, the radius of edge 30 may be proportional to the diameter of the passageways. In some embodiments, the radius of edge 30 is no more than about 7% of the diameter of the largest of the passageways. To be clear, in any embodiments, the respective passageways come together or meet at edge 30 to form a pointed or rounded apex; there is no separation between the passageways at edge 30 that would result in a flat surface substantially perpendicular to flow passage 39. In this regard, valve housing 18 includes a first housing port 32, a second housing port 34 and a third housing port 36. In certain embodiments, first housing port 32 is a fluid inlet, while second housing port 34 and third housing port 36 are first and second fluid outlets. Valve element 14 is disposed in bore 16 so that the passage ports 22, 26 are adjacent housing port 32 of flow passage 39, second passage port 24 is in fluid communication with second housing port 34 and fourth passage port 28 is in fluid communication with third housing port 36. In a preferred embodiment, edge 30 is positioned adjacent first housing port 32. Actuation of element 14 thereby adjusts the position of edge 30 and hence the fluid stream flowing through the ports.

In one or more embodiments described throughout this disclosure, it will be appreciated that since it is the physical convergence or intersection of passageways 20, 21 that form edge 30 and the passageways are defined within element 14, that the apex of edge 30 is not formed beyond the length of the passageways, but is formed within the valve element 14. In other words, in these embodiments, edge 30 does not extend into the port 32 of valve housing 18, but extends no farther than the valve bore 16. In this regard, although edge 30 may extend up to a point adjacent port 32, edge 32 can be said to be "spaced apart" from port 32. Since edge 30 does not extend into valve housing 18, valve element 14 is able to fully translate within valve bore 16. This allows edge 30 to be positioned to fully close off one of passageways 20, 21 as desired.

In one or more embodiments described throughout this disclosure, edge 30 may extend through port 32 into flow passage 39 to limit movement of valve element 14 within valve bore 16. In these embodiments, edge 30 will engage or seat against the wall of flow passage 39 adjacent port 32 to prevent further movement, i.e., translation or rotation, as the case may be. In these embodiments, it will be appreciated that when edge 30 is so engaged, all of the flow through flow passage 39 will be directed through only one of the passageways 20, 21, while the other passageway is closed off. In such embodiments, however, edge 30 is still shaped as described above to readily separate laminar flow while minimizing turbulence. A notch or similar seat may be formed in the wall of flow passage 39 to receive edge 30 in those embodiments where edge 30 extends into flow passage 39.

In all cases, it will be appreciated that valve element 14 is movable to position edge 30 so that, as desired, flow through passageways 20, 21 to housing ports 34, 36 can occur simultaneously. In this regard, housing ports 34, 36 are positioned so that passageways 20, 21 can be in fluid communication with both housing ports regardless of the position of edge 30 between the opposing walls of flow passage 39 (the exception being when edge 30 is seated against flow passage 39 to seal off one of the flow passageways 20, 21.

The embodiments described throughout this disclosure are not limited to any particular shape of the ports or passageways described herein, nor the placement of the passageways within the valve element 14 other than to ensure the convergence at edge 30 to form a pointed or rounded apex as described herein. For example, for linearly translatable elements, the passageways may be defined along the axis of the moveable element so that a port is defined in each end of the element (see for example, FIG. 3c). Likewise, the passageways may extend linearly through the element to the opposite side of the element.

In particular, for use as a phase separator, it is desirable that the incoming fluid at first housing port 32 is stabilized allowing the flow to become horizontally stratified. Persons of ordinary skill in the art will appreciate that this stratification is desirably achieved by gravitational effects acting on the different density or weighted components of the incoming fluid stream. Thus, it is desirable that the first housing port 32 is in fluid communication with a substantially horizontal flow passage 39. In one or more preferred embodiments, flow low passage 39 is of sufficient length to allow a multi-phase fluid to stabilize the flow and allow the flow to substantially stratify. In this regard, flow passage 39 is horizontal at least within valve housing 18. In this way, valve 12 can be adjusted by vertically translating valve element 14 within bore 16 to alter the cut of a fluid steam passing there through. Specifically, edge 30 can be moved up or down so as to position it at the boundary between the stratified fluid stream. Although not limited to particular components of a fluid stream, the valve 10 is particularly useful for liquid-liquid flow streams. For example, valve 12 can be adjusted to alter the cut of liquid stream 40 such that a first portion of the liquid 40a flows through first passageway 20 and a second portion of the liquid 40b flows through the second passageway 21. As shown, liquid stream 40 is stratified to form a boundary 40c between the two liquid portions 40a and 40b. The pointed or rounded apex of edge 30 is positioned at the boundary 40c between the portion streams to separate the portion streams while at the same time minimizing turbulence that could otherwise result in mixing of the portion streams. Persons of ordinary skill in the art will understand that passageways 20, 21, and their respective ports 22, 26 may be sized so that valve 12 may also be adjusted to divert all of liquid 40 flowing though housing port 32 into either first or second passageway 20, 21, as desired.

A sensor 50 may be placed upstream of the valve element 14, preferably along flow passage 39, in order to estimate the cut of the portions or components within the fluid stream, and hence the position of the stratification boundary, thereby permitting moveable element 14 to be adjusted so that edge 30 aligns with boundary 40c or otherwise so that edge 30 can be positioned to divide the stream 40 as desired. For example, in some instances, it may be desirable to include a percentage of one portion with the other portion when the stream 40 is divided. Any type of sensor disposed for making such cut measurements may be used.

Persons of ordinary skill in the art will appreciate that any type of actuation mechanism 52 can be used to move element 14 within bore 16, such as an electric motor or hydraulic motor. In the illustrated embodiment, actuation mechanism 52 is a motor that drives a screw 54 to move element 14. In other embodiments, element 14 can be manually positioned. In the case of a motor 52, sensor 50 may be used to actuate the motor 52 as desired in a control loop. Thus in one or more embodiments, a controller (not shown) may be utilized to monitor signals from sensor 50 and adjust the position of valve element 14 within valve body 18 utilizing motor 52.

To further promote stabilization of the flow prior to separation at edge 30, each outlet housing port 34, 36 is in fluid communication via a passageway 35 with a pump or similar pressure mechanism 37 to separately adjust the pressure of the individual cuts. Specifically, it will be appreciated that due to the differences in viscosities and/or other properties of the cuts, the first and second portions 40a, 40b may have different flow velocities. To ensure the flow is stabilized, a positive pressure is placed on the flow 40 via mechanism 37. Again, given the differences in viscosities and/or other properties of the portions 40a, 40b, each mechanism 37 may apply a different pressure to the flow passing therethrough. Thus, in one or more embodiments, mechanism 37a applies a first pressure to first portion 40a passing through passage 35a, while mechanism 37b applies a second pressure to second portion 40b passing through passage 35b. The first and second pressures may differ depending on the differences in the viscosities and/or other properties of the cuts, such that one pressure may be greater than the other pressure. In one or more embodiments, mechanism 37 is a positive displacement pump. By utilizing the mechanisms 37 downstream of valve element 14 to individually apply and adjust pressure on the separate fluid streams passing therethrough, the flow upstream of valve element 14 can be better stabilized in order to promote stratification as described above and minimize turbulence at edge 30.

In one or more embodiments, a controller or control mechanism 41, which may include a variable frequency drive, may be utilized to adjust mechanisms 37 to stabilize flow 40. In one or more embodiments, controller 41 adjusts mechanisms 37 based on the cut measured by cut sensor 50. In other words, based on the cut measured by cut sensor 50, the pressure in passageway 35a can be adjusted by mechanism 37a responsive to controller 41 and the pressure in passageway 35b can be adjusted by mechanism 37b responsive to controller 41.

Figure 2A:
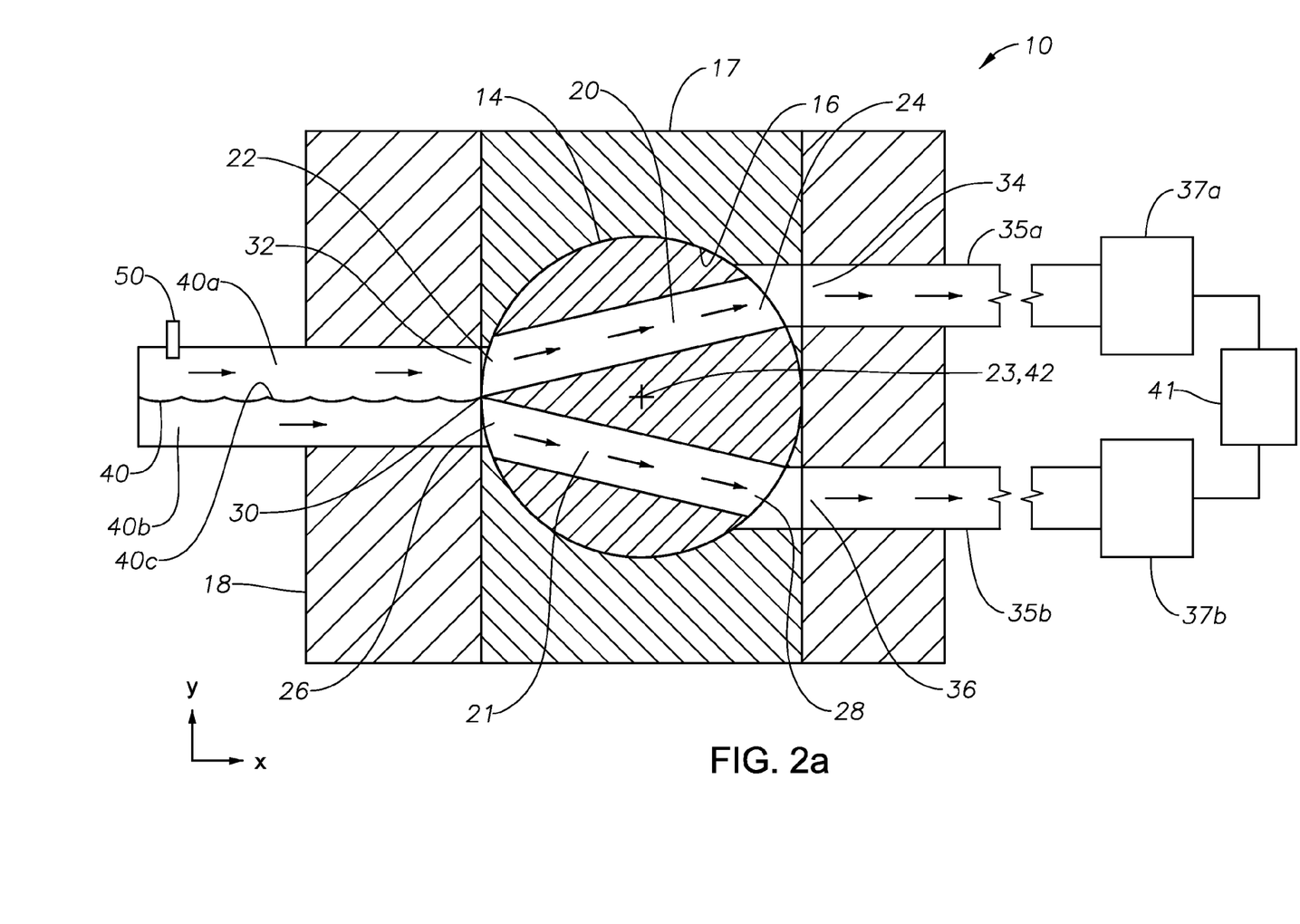
FIG. 2a illustrates a cross-sectional side view of an embodiment of an adjustable valve used as a fluid-fluid phase splitter in which the moveable element is a cylinder or disk that rotates about a horizontal axis.
Figure 2B:
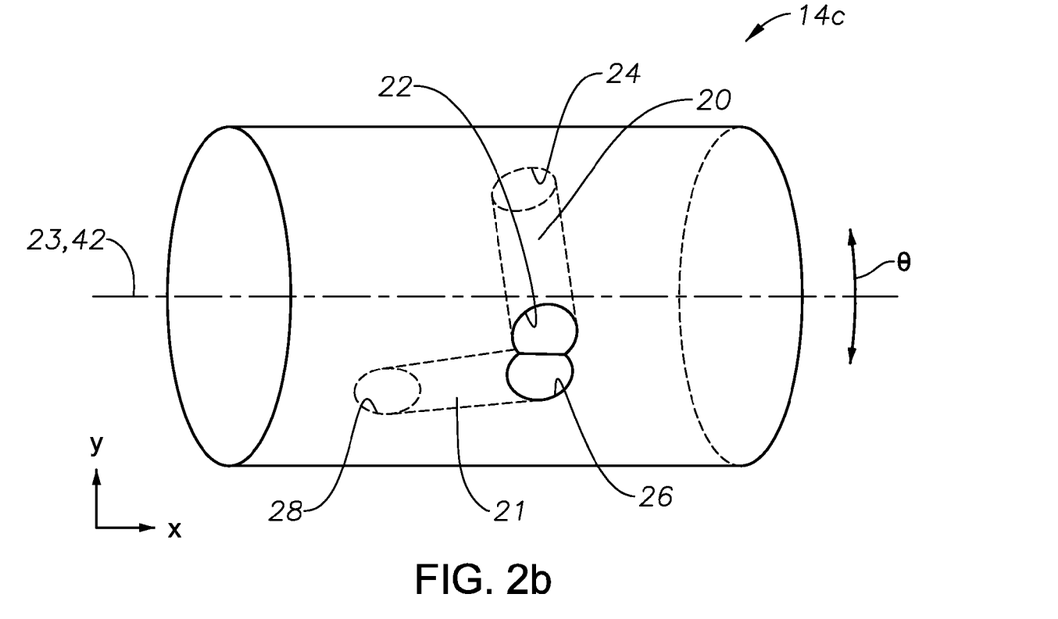
Figure 2C:
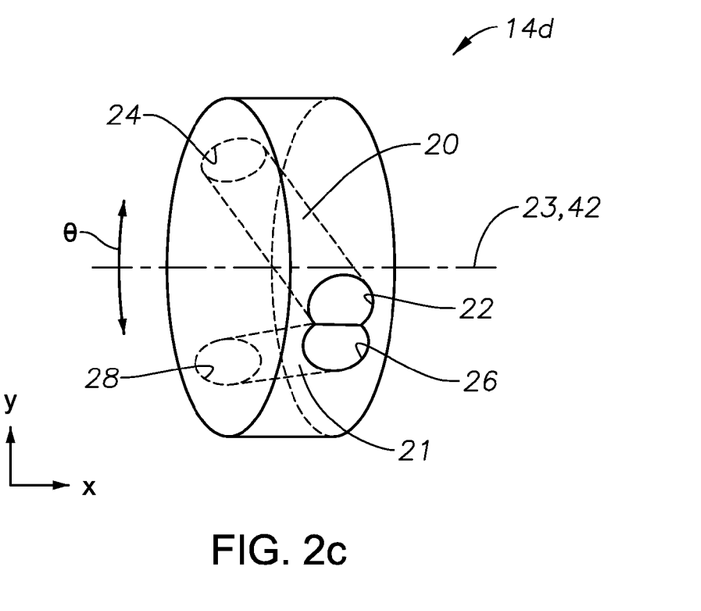

With reference to FIGS. 2a-2c, a moveable element 14 may be a rotatable, elongated cylinder 14c mounted in valve housing 18 as shown in FIG. 2b or a rotatable disk 14d as shown in FIG. 2c. In this embodiment, bore 16 of valve seat 17 is preferably horizontally oriented as illustrated by horizontal axis 23, and the cylinder 14c is positioned therein to rotate about a horizontally defined cylinder axis 42 to adjust the positions of passage ports 22, 26 with respect to housing port 32. Cylinder 14c is angularly rotated about the axis 42 in order to adjust the leading edge 30 relative to housing port 32. As with the first embodiments described in FIGS. 1a-1c, the embodiments illustrated in FIGS. 2a-2b are particularly useful with gravitationally stratified flow regimes or flow streams, particularly when the flow stream is comprised of at least two liquid components that can be stratified to form a boundary to which the edge 30 can be adjusted.

In FIGS. 2a, 2b and 2c, as in FIG. 1a, passageways 20, 21 converge at ports 22, 26 so that a portion of valve element 14 defining passageways 20, 21 forms an edge 30 at the apex of the converging passageways. Edge 30 is preferably substantially horizontally disposed in order to align with the horizontal stratification formed at fluid boundary 40c. Moreover, it will be appreciated that edge 30 functions to divide laminar flow from a flow passage 39 into two separate portions, while minimizing turbulence at edge 30, so that the separate portions of the flow are directed to separate passages 20, 21. In this regard, as best seen in FIG. 2a, in one or more preferred embodiments, edged 30 forms a point at the convergence of the two passageways 20, 21, and the pointed edge 30 can be positioned at the boundary between the two separate portions of the flow. In one or more embodiments, as shown in FIG. 2a, the cross-section of pointed edge 30 is triangular in shape adjacent flow passage 39 so as to form a point at the apex of the converging passageways, although it will be appreciated that paths of passageways 20, 21 in element 14 need not form a triangular cross-section there between beyond forming edge 30. More particularly, it will be appreciated that each passageway has a wall formed by element 14, and it is the respective walls of the two passageways 20, 21 that intersect to form the pointed edge 30. While the most preferred embodiments contemplate an edge 30 forming a point at the apex of the converging passageways, in other embodiments, edge 30 may be rounded so long as edge 30 does not create turbulence as the laminar flow is divided by edge 30. Thus, in some embodiments, the rounded edge may have a radius of no more than about 0.5 inches, while in other embodiments the rounded edge may have a radius of no more than about 0.32 inches. However, those skilled in the art will appreciate that the physical size of the valve may dictate the radius of edge 30. Thus, in some embodiments, the radius of edge 30 may be proportional to the diameter of the passageways. In some embodiments, the radius of edge 30 is no more than about 7% of the diameter of the largest of the passageways. To be clear, in any embodiments, the respective passageways come together or meet at edge 30 to form a pointed or rounded apex; there is no separation between the passageways at edge 30 that would result in a flat surface substantially perpendicular to flow passage 39.

It will further be appreciated that in one or more embodiments, port 24 will be substantially aligned with or otherwise adjacent port 34, and port 28 will be substantially aligned with or otherwise adjacent port 36 (as shown in FIGS. 1a and 2a), when edged 30 is aligned between the walls of passageway 39. In other words, each fluid cut flowing through the respective passageways 20, 21 will flow substantially unimpeded into its respective outlet 34, 36 so that there can be full fluid communication simultaneously between passageways 20, 21 and their respective ports 34, 36 during a cut separating operation, as desired. Of course, in other operations, it may be desirable to entirely close off one of the passageways 20, 21, in which case such fluid communication will be suspended. In any event, while edge 30 may be aligned to be closer to one wall of passageway 39 as opposed to the other wall, the respective ports will remain in substantial fluid communication with one another when aligned between the walls as necessary to permit a fluid cut to flow to an outlet port. Persons of ordinary skill in the art will appreciate that while a passageway may have a single wall, such as for example circular passageways, for purposes of this disclosure, the opposing portions of the wall will be described as "walls" so as to establish alignment of edge 30 therebetween. In other embodiments, a passageway may have other shapes with separately defined walls.

While the embodiments of valve 10 described above are particularly useful as phase separators, the embodiments may also be used to mix separate fluid components 40a and 40b into a single fluid stream 40. In such case, a first fluid component 40a may be introduced into first passageway 20 and a second fluid component 40b may be introduced into second passageway 21. The two fluid components are combined at edge 30 and flow through passage 49, such that port 32 is a fluid outlet port. The relative portions of the fluid components 40a, 40b within fluid stream 40 can be controlled by adjustment of movable element 14. In other words, valve 10 may be used to mix fluids.

Figure 3A:
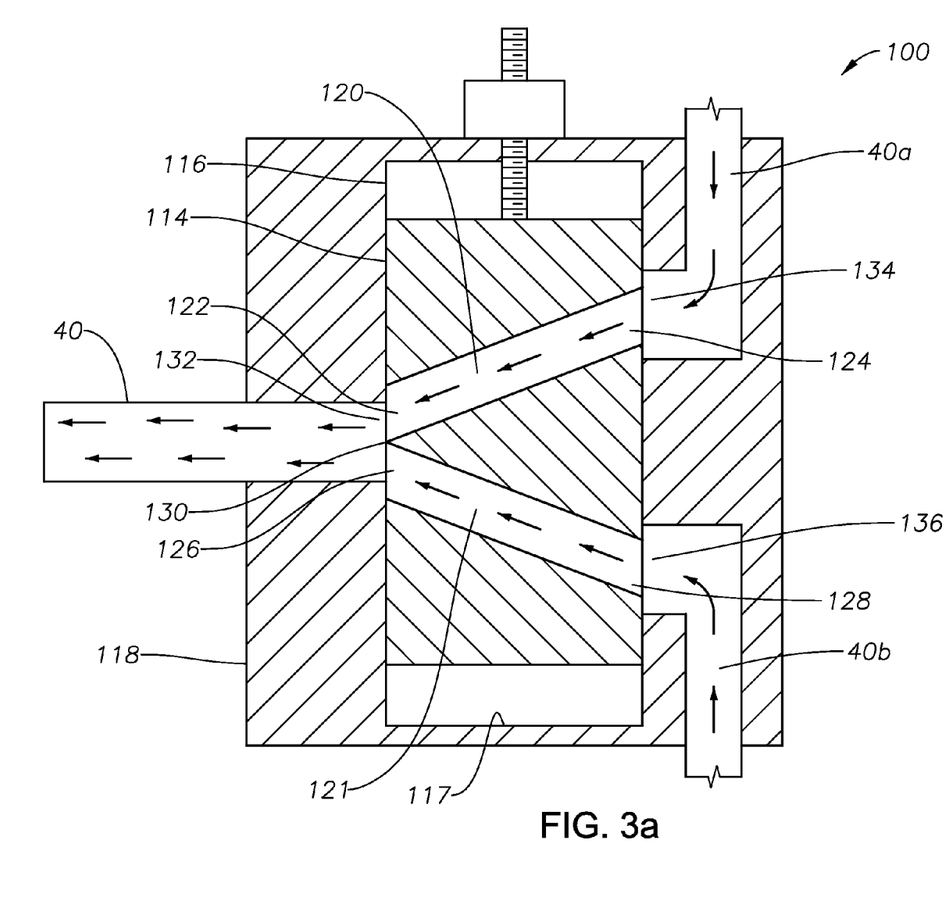
FIG. 3a illustrates a cross-sectional top view of an embodiment of an adjustable valve used as a fluid-fluid mixer in which the moveable element is a block or cylinder that linearly translates.

Turning to FIG. 3a, a top view of a valve 100 having an adjustable valve element 114 is shown. Movable valve element 114 is mounted to translate in a valve bore 116 defined within a valve housing 118 to form a valve seat 117. Movable element 114 includes a first passageway 120 having a first passage port 122 and a second passage port 124, as well as a second passageway 121 having a third passage port 126 and a forth passage port 128. FIG. 3a illustrates the valve inlets and outlets arranged in a T-configuration. Persons of ordinary skill in the art will appreciate that the valves disclosed herein are not limited to a particular configuration with respect to valve housing 18 unless otherwise identified in a specific embodiment. Thus, second and third housing ports 34, 36, for example, may be disposed to exit the valve housing parallel to one another, such as is shown in FIG. 1a, or opposite one another, such as is shown in FIG. 3a.

Figure 3B:
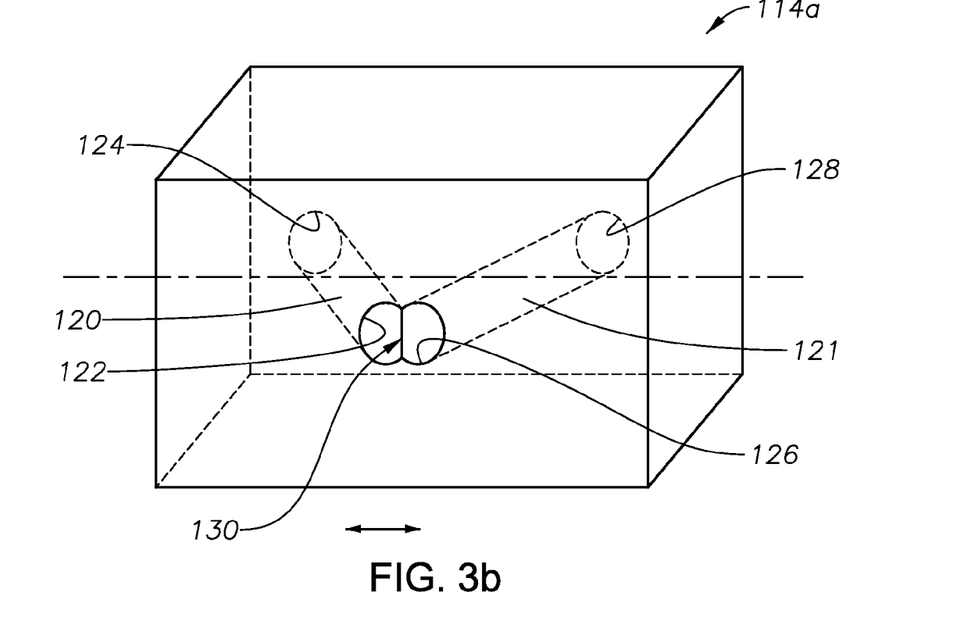
Figure 3C:
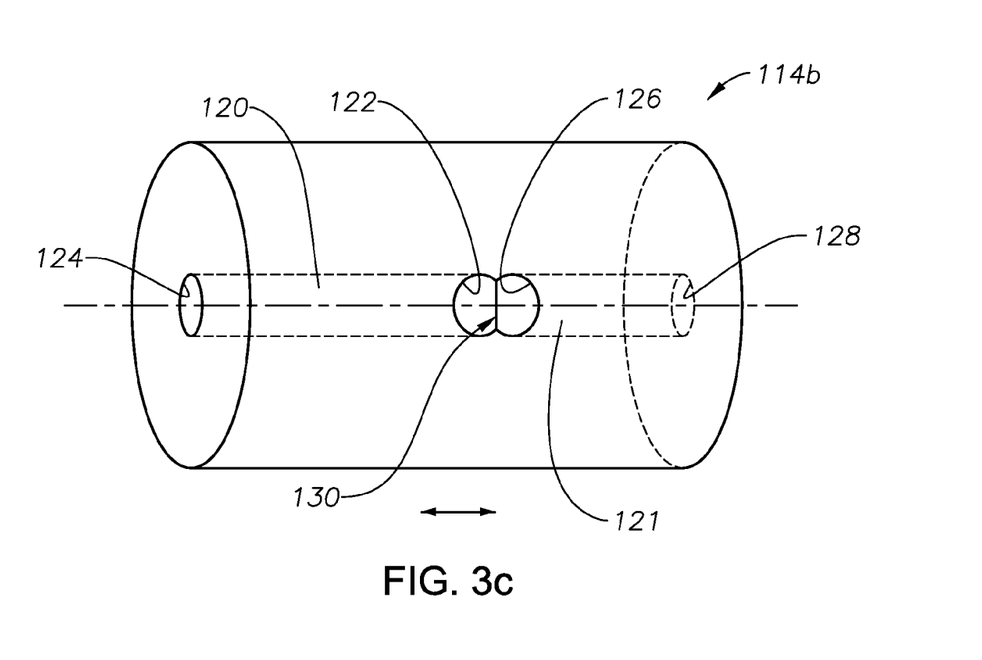

FIG. 3b illustrates movable valve element 114 as a slidable block 114a, while FIG. 3c illustrates movable valve element 114 as a slidable cylinder 114b. In either case, with reference to FIG. 3a, passageways 120, 121 are formed in element 114 so that ports 122, 126 are adjacent one another, while ports 124, 128 are spaced apart from one another. In one embodiment, passageways 120, 121 converge at ports 122, 126 so that a portion of valve element 114 defining passageways 120, 121 forms an edge 130. Valve housing 118 includes a first housing port 132, a second housing port 134 and a third housing port 136. In certain embodiments, first housing port 132 is a fluid outlet, while second housing port 134 and third housing port 136 are first and second fluid inlets. Valve element 114 is disposed in bore 116 so that the passage ports 122, 126 are adjacent housing port 132, second passage port 124 is in fluid communication with second housing port 134 and fourth passage port 128 is in fluid communication with third housing port 136. In a preferred embodiment, edge 130 is positioned adjacent first housing port 132. Actuation of element 114 thereby adjusts the position of edge 130 and hence the fluid stream flowing through the ports.

Figure 4A:
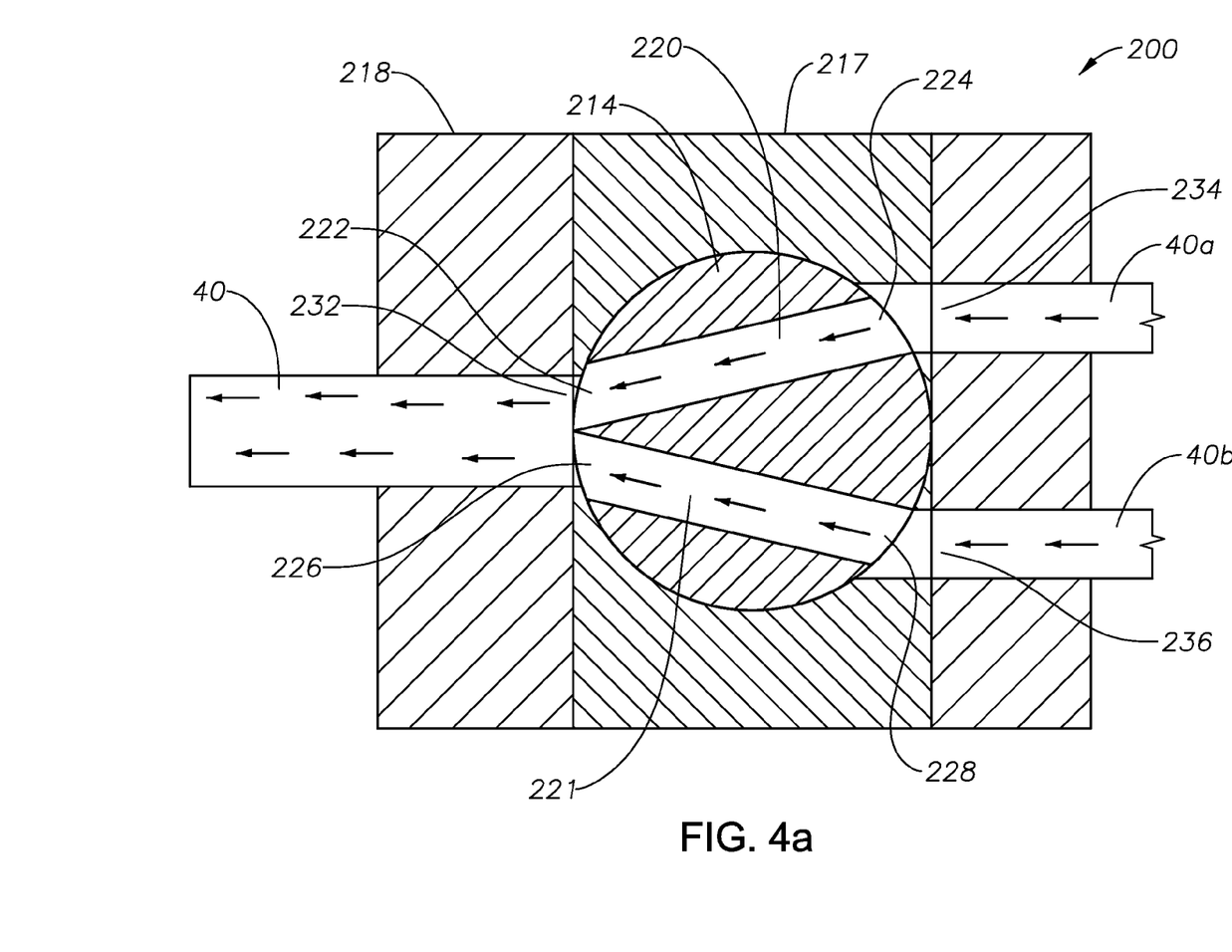
FIG. 4a illustrates a cross-sectional top view of an embodiment of an adjustable valve used as a fluid-fluid mixer in which the moveable element is a disk that axially rotates.

Turning to FIG. 4a, a top view of a valve 200 having an adjustable valve element 214 is shown. Movable valve element 214 is mounted to rotate in a valve seat 217 carried within a valve housing 218. Movable element 214 includes a first passageway 220 having a first passage port 222 and a second passage port 224, as well as a second passageway 221 having a third passage port 226 and a forth passage port 228.

Figure 4B:
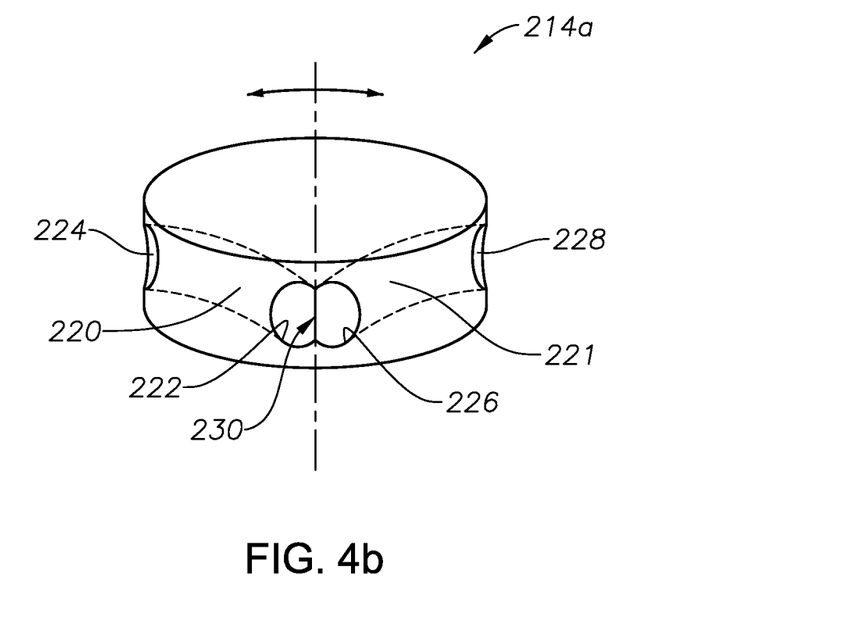

FIG. 4b illustrates movable valve element 214 as a rotatable disk 214a. Passageways 220, 221 are formed in element 214 so that ports 222, 226 are adjacent one another, while ports 224, 228 are spaced apart from one another. In one embodiment, passageways 220, 221 converge at ports 222, 226 so that a portion of valve element 214 defining passageways 220, 221 forms an edge 230. Valve housing 218 includes a first housing port 232, a second housing port 234 and a third housing port 236. In certain embodiments, first housing port 232 is a fluid outlet, while second housing port 234 and third housing port 236 are first and second fluid inlets. Valve element 214 is disposed in seat 217 so that the passage ports 222, 226 are adjacent housing port 232, second passage port 224 is in fluid communication with second housing port 234 and fourth passage port 228 is in fluid communication with third housing port 236. In a preferred embodiment, edge 230 is positioned adjacent first housing port 232. Actuation of element 214 thereby adjusts the position of edge 230 and hence the fluid stream flowing through the ports.

Fluid cut sensors and/or actuation motors as previously described may be utilized with any of the embodiments described herein. In this regard, any mechanism may be used to rotate, translate or otherwise adjust the moveable elements as described herein and the disclosure in not limited in this regard.

Persons of ordinary skill in the art will appreciate that the moveable element 14, whether angularly rotatable or linearly translatable, can be moved to alter the cross-sectional area of the particular passageway exposed to the housing port. As such, the fluids flowing through the ports and passages may be managed as desired. For example, the moveable element may be adjusted based on the cut of a flow stream 40 having first and second liquid components 40a, 40b so that the first and second liquid components can be separately ported. Alternatively, separate fluid components 40a, 40b can be mixed into a single stream 40 utilizing the valve to adjust the relative portions of each component within the stream.

Thus a fluid phase splitting system has been described. Embodiments of the fluid phase splitting system generally include a valve having a housing having a horizontal inlet, a first outlet and a second outlet; and a rotatable element rotatably mounted in the housing, the rotatable element rotatable about an axis and having a first passageway with an inlet and an outlet and a wall defining the first passageway; and a second passageway having an inlet and an outlet and a wall defining the second passageway, wherein the inlets of the first and second passageways are adjacent one another and the outlets of the first and second passageways are spaced apart from one another, the inlets disposed adjacent housing inlet, the first passageway outlet disposed adjacent the first housing outlet and the second passageway outlet disposed adjacent the second housing outlet, wherein the first and second passageway walls converge at their respective inlets to form an edge adjacent the housing inlet, wherein the edge is substantially parallel with the axis of the rotatable element. In other embodiments, a fluid phase splitting system generally includes a valve housing having a first port formed by a horizontal flow passage, a second port and a third port; and a valve element moveably mounted in the housing, the valve element rotatable about an axis and having a first passageway extending between first and second ports of the valve element; and a second passageway extending between third and fourth ports of the valve element, wherein the first and third ports of the first and second passageways, respectively, are adjacent one another and the second and fourth ports of the first and second passageways, respectively, are spaced apart from one another, the first and third ports disposed adjacent the first housing port, the second port of the first passageway disposed adjacent the second housing port and the fourth port of the second passageway disposed adjacent the third housing port, wherein the first and second passageways intersect at their respective first and third ports to form an edge adjacent the first housing port. 35. In other embodiments, a fluid phase splitting system generally includes a valve having a housing having a first port formed by a horizontal flow passage, a first outlet and a second outlet; a rotatable element rotatably mounted in the housing, the rotatable element rotatable about an axis and having a first passageway with an inlet and an outlet; and a second passageway having an inlet and an outlet, wherein the inlets of the first and second passageways are adjacent one another and adjacent the first port, the first passageway outlet disposed adjacent the first housing outlet and the second passageway outlet disposed adjacent the second housing outlet, wherein the first and second passageways converge at their respective inlets to form an edge adjacent the first port, wherein the edge is substantially parallel with the axis of the rotatable element; a cut sensor disposed along the horizontal flow passage and disposed to measure the cut of fluid flowing within the flow passage; and a motor disposed to rotate the valve element based on the cut sensor measurements. In yet other embodiments, a fluid phase splitting system generally includes a valve having a housing having a first port formed by a horizontal flow passage, a first outlet and a second outlet; a rotatable element rotatably mounted in the housing, the rotatable element rotatable about an axis and having a first passageway with an inlet and an outlet; and a second passageway having an inlet and an outlet, wherein the inlets of the first and second passageways are adjacent one another and adjacent the first port, the first passageway outlet is adjacent the first housing outlet and the second passageway outlet is adjacent the second housing outlet, wherein the first and second passageways converge at their respective inlets to form an edge adjacent the first port, wherein the edge is substantially parallel with the axis of the rotatable element.

For any of the foregoing embodiments, the system may include any one of the following elements, alone or in combination with each other:

The edge comprises a pointed apex.

The edge comprises a rounded apex.

The edge is substantially horizontal.

A valve seat within the valve housing, the valve seat defining a substantially horizontal cylindrical bore in which the rotatable element is disposed, wherein the rotatable element is defined along an axis that is substantially horizontal.

The rotatable element is an elongated cylinder.

The rotatable element is a disk.

A horizontal passageway in fluid communication with the horizontal inlet; and a fluid cut sensor disposed along the horizontal passageway.

A motor disposed to rotate the rotatable element based on the cut sensor.

The horizontal inlet is characterized by walls and wherein the outlet of the first flow passage is substantially aligned with the first outlet of the valve housing and the outlet of the second flow passage is substantially aligned with the second outlet of the valve housing when the edge is aligned between the inlet walls.

A pressure mechanism in fluid communication with a housing outlet in order to apply positive pressure on the fluid within the passageway communicating with the housing outlet.

A first pressure mechanism in fluid communication with the first housing outlet and a second pressure mechanism in fluid communication with the second housing outlet.

At least one pressure mechanism is a positive displacement pump.

Each pressure mechanism is a positive displacement pump.

A horizontal passageway in fluid communication with the horizontal inlet; a fluid cut sensor disposed along the horizontal passageway; and a controller coupled to the fluid cut sensor and disposed to adjust the first and second pressure mechanisms responsive to the fluid cut sensor.

A valve seat within the valve housing, the valve seat defining a substantially vertical bore in which the moveable element is disposed.

Each passageway is characterized by a wall defining the passageway, and wherein the passageway walls intersect within the valve rotor to form the edge.

The edge is substantially horizontal.

Each passageway is characterized by a wall defining the passageway, and wherein the passageway walls converge to form a pointed edge that is spaced apart from the first port of the valve housing so as not to extend into the horizontal flow passage.

A valve seat within the valve housing, the valve seat defining a substantially horizontal bore in which the moveable element is disposed, wherein the moveable element is defined along an axis that is substantially horizontal.

The bore is cylindrical in cross section and the valve element is an elongated cylinder.

The cylinder is rotatably mounted in the bore.

A valve seat within the valve housing, the valve seat defining an elongated bore in which the moveable element is disposed, wherein the moveable element is defined along an axis that is substantially horizontal.

The bore is cylindrical in cross section and the valve element is a circular disk.

The disk is rotatably mounted in the bore.

A fluid cut sensor disposed along the horizontal flow passage.

A motor disposed to move the valve element based on the cut sensor.

A pressure mechanism in fluid communication with a housing outlet in order to apply positive pressure on the fluid within the passageway communicating with the housing outlet.

A first pressure mechanism in fluid communication with the first housing outlet and a second pressure mechanism in fluid communication with the second housing outlet.

A fluid cut sensor disposed along the horizontal passageway; and a controller coupled to the fluid cut sensor and disposed to adjust the first and second pressure mechanisms responsive to the fluid cut sensor.

Thus, a method for splitting phase components of a fluid having a first fluid portion and a second fluid portion has been described. The method generally includes stabilizing the fluid so as to have a first fluid portion substantially separate from a second fluid portion with a fluid boundary formed therebetween; positioning the leading edge of a valve element so as to be substantially aligned with the fluid boundary; and simultaneously directing the first fluid portion to a first passageway within the valve element and the second fluid portion to a second passageway within the valve element.

For any of the foregoing embodiments, the method may include any one of the following, alone or in combination with each other:

Sensing the cut of the stabilized fluid at a location upstream of the valve element.

Positioning comprises adjusting the position of the valve element based on the sensed cut.

Adjusting comprises rotating the valve element to adjust the leading edge of the valve element.

Stabilizing comprises horizontally stratifying the fluid.

Horizontally stratifying comprises allowing the fluid to form into a first fluid portion having a first fluid density and a second fluid portion having a second fluid density different than the first fluid density.

Stabilizing comprises forming a boundary between the first and second fluid portions based on the densities of the first and second fluid portions.

Measuring the liquid cut of the fluid and adjusting the valve element based on the measured cut.

Actuating a motor in response to the measured liquid cut in order to adjust the leading edge of the valve element.

Stabilizing comprises apply a first pressure to the first fluid portion in the first passageway and apply a second pressure to the second fluid portion in the second passageway.

Measuring the liquid cut of the fluid upstream of the valve element and adjusting the first and second pressures based on the measured fluid cut.

Measuring the viscosity of each fluid portion and selecting the first and second pressures based on the measured viscosities.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A valve comprising:
a housing having a horizontal inlet, a first outlet and a second outlet;
a rotatable element rotatably mounted in the housing, the rotatable element rotatable about an axis and having a first passageway with an inlet and an outlet and a wall defining the first passageway; and a second passageway having an inlet and an outlet and a wall defining the second passageway, wherein the inlets of the first and second passageways are adjacent one another and the outlets of the first and second passageways are spaced apart from one another, the inlets disposed adjacent housing inlet, the first passageway outlet disposed adjacent the first housing outlet and the second passageway outlet disposed adjacent the second housing outlet, wherein the first and second passageway walls converge at their respective inlets to form an edge adjacent the housing inlet, wherein the edge is substantially parallel with the axis of the rotatable element; and
a pressure mechanism in fluid communication with a housing outlet in order to apply positive pressure on the fluid within the passageway communicating with the housing outlet.

2. The valve of claim 1, further comprising a first pressure mechanism in fluid communication with the first housing outlet and a second pressure mechanism in fluid communication with the second housing outlet.

3. The valve of claim 2, wherein each pressure mechanism is a positive displacement pump.

4. The valve of claim 3, further comprising a horizontal passageway in fluid communication with the horizontal inlet; a fluid cut sensor disposed along the horizontal passageway; and a controller coupled to the fluid cut sensor and disposed to adjust the first and second pressure mechanisms responsive to the fluid cut sensor.

5. The valve of claim 1, wherein the edge is pointed.

6. The valve of claim 5, wherein the edge is substantially horizontal.

7. The valve of claim 1, further comprising a valve seat within the valve housing, the valve seat defining a substantially horizontal cylindrical bore in which the rotatable element is disposed, wherein the rotatable element is defined along an axis that is substantially horizontal.

8. The valve of claim 7, wherein the wherein the edge is rounded.

9. The valve of claim 8, wherein the edge is substantially horizontal.

10. The valve of claim 1, wherein the rotatable element is an elongated cylinder.

11. The valve of claim 1, wherein the rotatable element is a disk.

12. The valve of claim 1, further comprising a horizontal passageway in fluid communication with the horizontal inlet; and a fluid cut sensor disposed along the horizontal passageway.

13. The valve of claim 12, further including a motor disposed to rotate the rotatable element based on the cut sensor.

14. The valve of claim 1, wherein the horizontal inlet is characterized by walls and wherein the outlet of the first flow passage is substantially aligned with the first outlet of the valve housing and the outlet of the second flow passage is substantially aligned with the second outlet of the valve housing when the edge is aligned between the inlet walls.

15. A valve comprising:
a valve housing having a first port formed by a horizontal flow passage, a second port and a third port;
a valve element moveably mounted in the housing, the valve element rotatable about an axis and having a first passageway extending between first and second ports of the valve element; and a second passageway extending between third and fourth ports of the valve element, wherein the first and third ports of the first and second passageways, respectively, are adjacent one another and the second and fourth ports of the first and second passageways, respectively, are spaced apart from one another, the first and third ports disposed adjacent the first housing port, the second port of the first passageway disposed adjacent the second housing port and the fourth port of the second passageway disposed adjacent the third housing port, wherein the first and second passageways intersect at their respective first and third ports to form an edge adjacent the first housing port;
a pressure mechanism in fluid communication with a housing outlet in order to apply positive pressure on the fluid within the passageway communicating with the housing outlet.

16. The valve of claim 15, further comprising a first pressure mechanism in fluid communication with the first housing outlet and a second pressure mechanism in fluid communication with the second housing outlet.

17. The valve of claim 16, wherein each pressure mechanism is a positive displacement pump.

18. The valve of claim 17, further comprising a fluid cut sensor disposed along the horizontal passageway; and a controller coupled to the fluid cut sensor and disposed to adjust the first and second pressure mechanisms responsive to the fluid cut sensor.

19. The valve of claim 15, wherein the edge is pointed.

20. The valve of claim 19, wherein the edge is substantially horizontal.

21. The valve of claim 15, wherein each passageway is characterized by a wall defining the passageway, and wherein the passageway walls intersect within the valve element to form the edge.

22. The valve of claim 15, wherein the edge is substantially horizontal.

23. The valve of claim 15, wherein each passageway is characterized by a wall defining the passageway, and wherein the passageway walls converge to form a pointed edge that is spaced apart from the first port of the valve housing so as not to extend into the horizontal flow passage.

24. The valve of claim 15, further comprising a valve seat within the valve housing, the valve seat defining a substantially horizontal bore in which the moveable element is disposed, wherein the moveable element is defined along an axis that is substantially horizontal.

25. The valve of claim 24, wherein the bore is cylindrical in cross section and the valve element is an elongated cylinder.

26. The valve of claim 25, wherein the cylinder is rotatably mounted in the bore.

27. The valve of claim 15, further comprising a valve seat within the valve housing, the valve seat defining an elongated bore in which the moveable element is disposed, wherein the moveable element is defined along an axis that is substantially horizontal.

28. The valve of claim 27, wherein the bore is cylindrical in cross section and the valve element is a circular disk.

29. The valve of claim 28, wherein the disk is rotatably mounted in the bore.

30. The valve of claim 15, further comprising a fluid cut sensor disposed along the horizontal flow passage.

31. The valve of claim 30, further including a motor disposed to move the valve element based on the cut sensor.

32. The valve of claim 15, further comprising a valve seat within the valve housing, the valve seat defining a substantially vertical bore in which the moveable element is disposed.

* * * * *